United States Patent [19]

Terrisse et al.

[11] Patent Number: 4,909,247

[45] Date of Patent: Mar. 20, 1990

[54] AIRCRAFT EMERGENCY BREATHING ASSEMBLY

[75] Inventors: Patrick R. Terrisse, LaVerne; James W. Ballinger, Charter Oaks, both of Calif.

[73] Assignee: Figgie International, Inc., Willoughby, Ohio

[21] Appl. No.: 191,271

[22] Filed: May 6, 1988

[51] Int. Cl.⁴ .................... A62B 7/00; A62B 7/14
[52] U.S. Cl. ..................... 128/206.27; 128/205.25; 128/204.29
[58] Field of Search ............... 128/202.27, 204.18, 128/204.29, 205.11, 205.24, 205.25, 206.27; 37/DIG. 2; 206/803; 220/212

[56] References Cited

U.S. PATENT DOCUMENTS

| | | | |
|---|---|---|---|
| 2,306,382 | 12/1942 | Fink et al. | 128/204.29 |
| 2,507,450 | 5/1950 | Millikan et al. | 128/202.26 |
| 2,809,633 | 10/1957 | Swearingen et al. | 128/206.25 |
| 2,931,355 | 4/1960 | Miller et al. | 128/204.29 |
| 2,934,293 | 4/1960 | Boehme et al. | 128/204.29 |
| 3,073,301 | 1/1963 | Hay et al. | 128/205.24 |
| 3,503,394 | 3/1970 | Hotz et al. | 128/206.27 |
| 3,536,070 | 10/1970 | Bovard | 128/202.26 |
| 4,154,237 | 5/1979 | Courter | 128/206.27 |
| 4,481,945 | 11/1984 | Levine | 128/206.27 |

OTHER PUBLICATIONS 828,362, Jun. 9, 1958, Kidde Co. Ltd.

Primary Examiner—Edgar S. Burr
Assistant Examiner—Kimberly L. Asher
Attorney, Agent, or Firm—Christel, Bean & Linihan

[57] ABSTRACT

An emergency breathing assembly adapted for use in an aircraft to automatically present a breathing mask to a user upon a loss of cabin pressurization. The assembly includes a storage container having an access opening for deployment of the mask stowed within the container. The container is mounted in the aircraft cabin such that the access opening is positioned in a generally vertical plane of orientation relative to the user. The assembly further includes a door connected to the container for closing the access opening and thereby retaining the mask therein, means for moving the door from a closed to an open position relative to the access opening in response to a change in cabin pressurization, and means automatically operable upon movement of the door to an open position to eject the mask from the container through the access opening.

12 Claims, 3 Drawing Sheets

AIRCRAFT EMERGENCY BREATHING ASSEMBLY

FIELD OF THE INVENTION

This invention relates to a method and assembly for deploying an emergency breathing mask in an aircraft, which assembly is automatically operable to present the breathing mask to a user upon loss of cabin pressurization, and more particularly to an assembly mounted in an aircraft in a vertical plane of orientation relative to the user and a method of deploying a breathing mask therefrom without initial reliance on gravity.

BACKGROUND OF THE INVENTION

Many aircraft are required to provide passengers and crew members in the pressurized cabin with an emergency breathing mask in the event of a sudden loss of pressure due to a rupture in the cabin wall or to a failure in the aircraft's pressurizing system. The conventional emergency breathing mask is typically stowed in an overhead storage container directly over the user. Upon a sudden loss of cabin pressure, the container door opens automatically and the mask in deployed by gravity to the user.

However, the configuration of some aircraft prevents mounting the storage container directly overhead the user. For example, military aircraft such as cargo planes often require an open cabin for storage, and therefore, necessitate mounting the emergency breathing mask storage containers on the side wall or shell of the aircraft so that the container opening is in a vertical plane of orientation relative to an at an elevation above the user. When the container is mounted in this manner and the opening is positioned vertically relative to the user, the arrangement is such as to preclude initial gravity induced deployment of the breathing masks from the container to the user. Consequently, it would not be feasible to utilize the conventional type overhead storage container when mounting in a vertical plane of orientation. Therefore, a new method of presenting an emergency breathing mask to a user is needed when the storage container is not mounted in an orientation enabling gravity alone to deploy the mask to the user.

OBJECTS AND SUMMARY OF THE INVENTION

Accordingly, it is an object of the present invention to provide an emergency breathing assembly for a pressurizeable aircraft, which assembly is automatically operable to present a breathing mask to a user upon a loss of cabin pressure, the breathing mask being deployed from within a storage container through an access opening having a generally vertical plane of orientation with respect to the user without initial reliance on gravity.

Thus, the assembly includes a storage container having an access opening for deployment of the mask stowed within the container. The container is adapted to be mounted in the aircraft cabin with the access opening positioned in a generally vertical plane of orientation relative to the user. The storage assembly further includes a door connected to the container for closing the access opening and thereby retaining the mask therein, means for moving the door from a closed to an open position relative to the access opening in response to a change in cabin pressurization, and means automatically operable upon movement of the door to an open position to eject the mask from the container through the access opening.

The above will become more apparent to those skilled in the art after a consideration of the following detailed description taken in conjunction with the accompanying drawings in which a presently preferred form of this invention is illustrated.

DETAILED DESCRIPTION OF THE PREFERRED EMBODIMENTS

Figure 1:
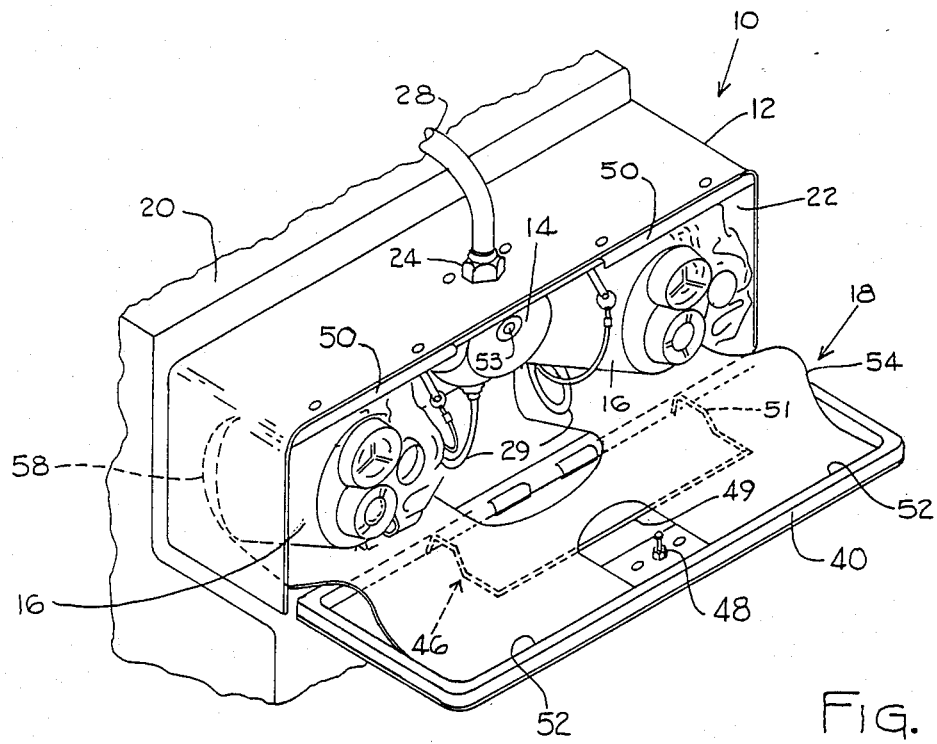
FIG. 1 is a perspective view of an emergency breathing assembly in accordance with the present invention, shown mounted in an aircraft with the door partially open, prior to deployment of the masks from the container.

There is illustrated in FIG. 1 an aircraft emergency breathing assembly in accordance with the present invention, generally indicated 10. The assembly 10 includes a generally rectangularly shaped storage container 12 carrying a fluid valve assembly 14, a pair of oronasal oxygen masks 16 and means, generally indicated 18, for supporting masks 16 thereon in a stowed condition within container 12. Means 18, shown herein as a fabric liner, also functions to eject masks 16 from container 12 in the event of a sudden drop in cabin pressurization as hereafter described. The storage container 12 is adapted for mounting above the user on the wall or shell of an aircraft fuselage, shown fragmentarily at 20, whereby access opening 22 of container 12 is positioned in a substantially vertical plane of orientation with respect to the user. A plurality of such breathing assemblies 10 can be mounted on the wall or shell 20 within the aircraft fuselage so as to provide one or more at each passenger station and in the crew compartment. Each assembly 10 can serve a number of passengers at each station depending upon the number of masks 16 within container 12. The illustrated form provides face masks for two users at a station although a greater or lesser number of face masks obviously could be provided at each station, depending upon the number of passengers to be served.

Figure 2:
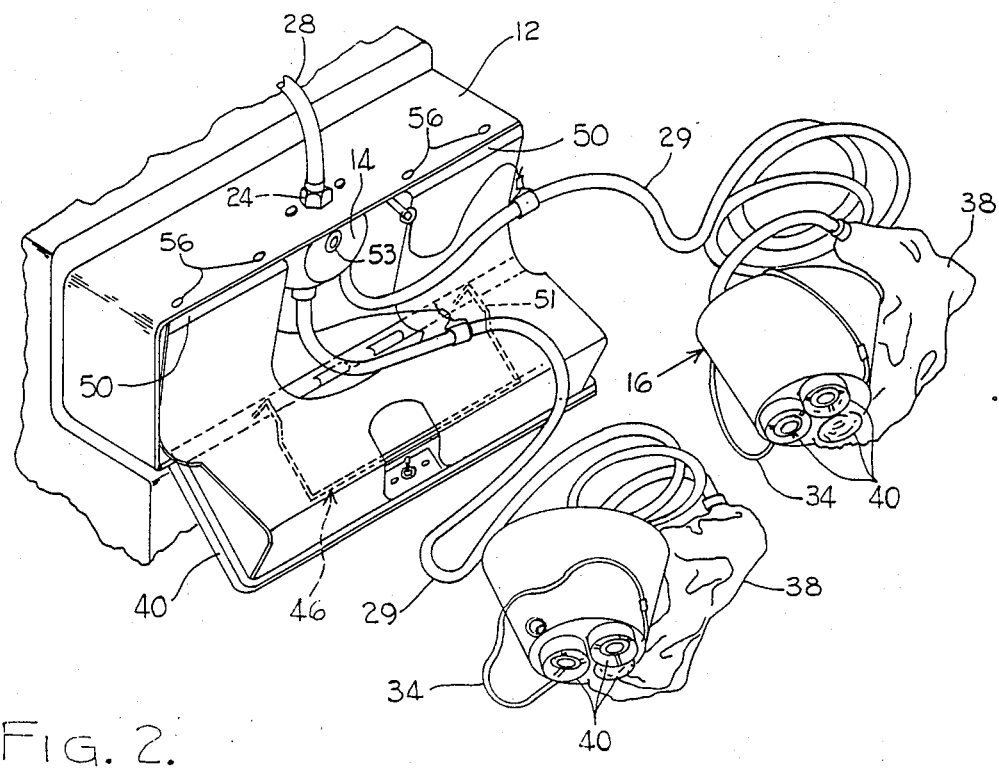
FIG. 2 is a corresponding view thereof but with the door more fully open, showing the oxygen masks ejected from the container.
Figure 3:
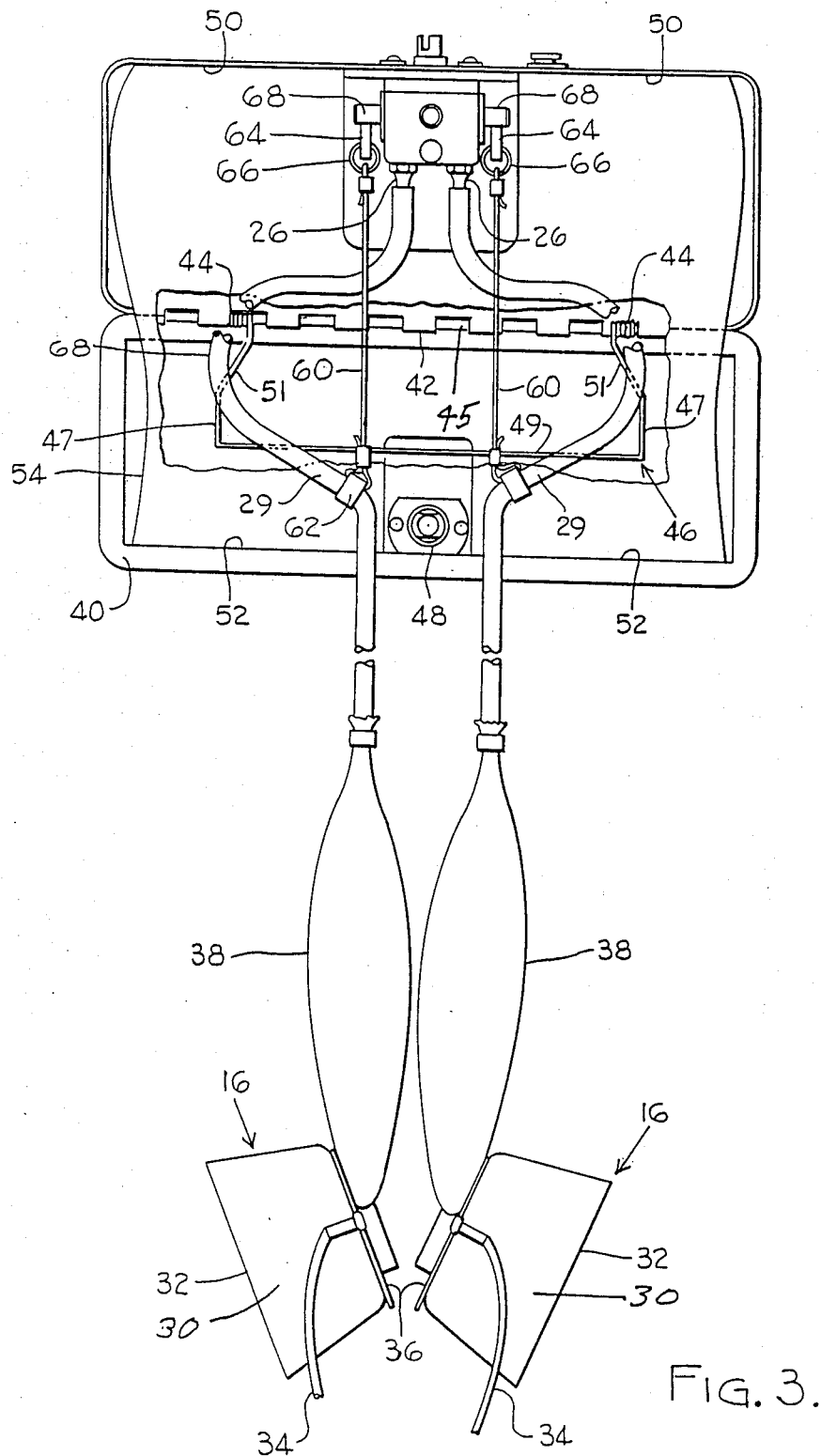
FIG. 3 is a front elevational view thereof showing the masks fully deployed from within the container and ready for use.
Figure 4:
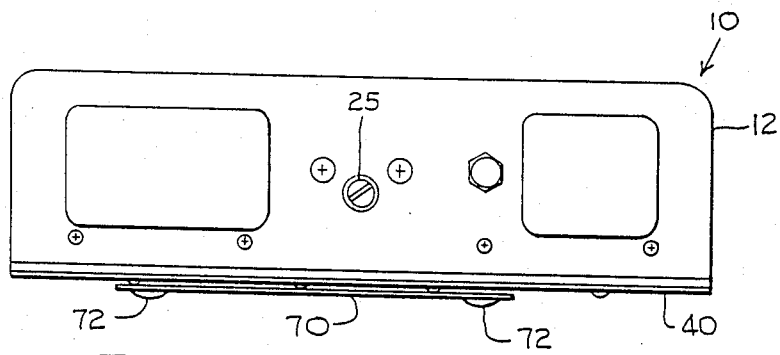
FIG. 4 is a top plan view of the emergency breathing assembly in a closed condition.
Figure 5:
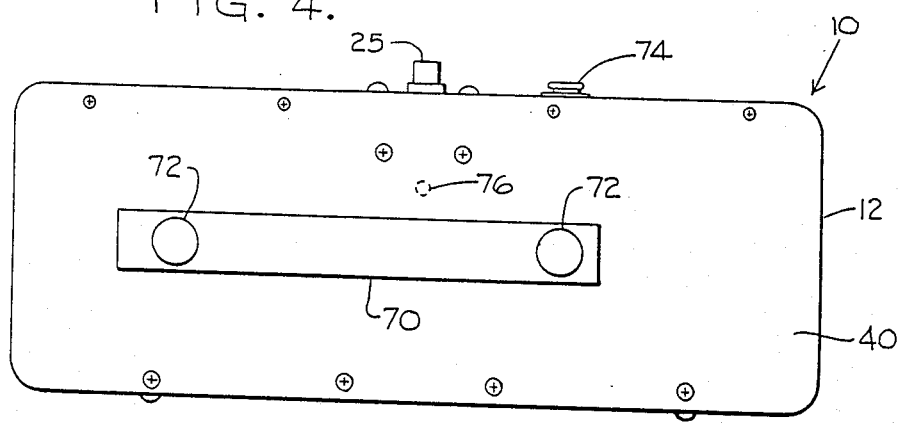
FIG. 5 is a front elevational view thereof.
Figure 6:
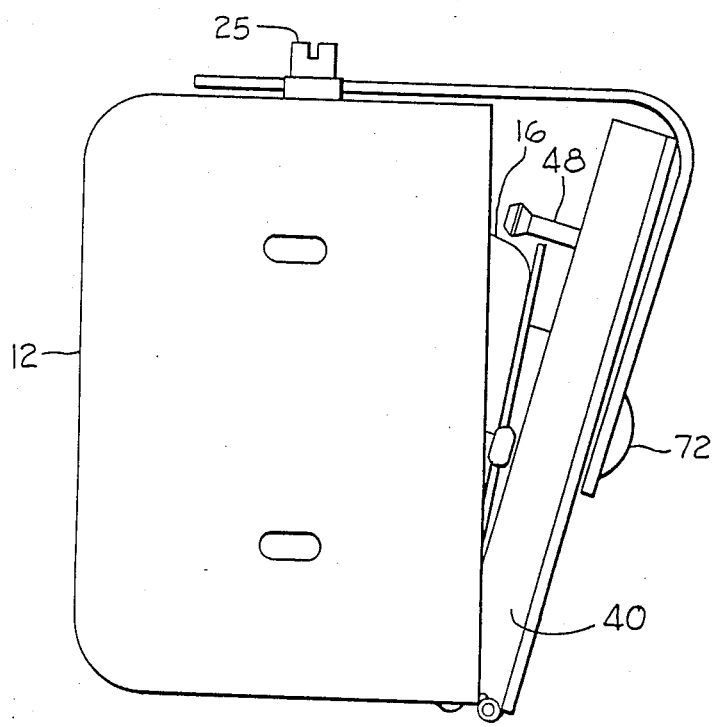
FIG. 6 is an end elevational view thereof, partially open in a test mode.

Referring to FIGS. 1-3, a fluid valve assembly 14 is carried within each container 12 in an equilateral relation to the masks 16, by a suitable mounting bracket (not shown). The valve assembly 14 includes normally closed, continuous flow valves and has an inlet port receiving a fitting 24 (FIG. 1) for connection to a fluid source (not shown) and one outlet port fitting 26 for each mask 16 for dispensing the fluid to the mask. Prior to installation, the inlet port can be closed by a temporary plug 25 (FIGS. 4-6). A flexible fluid supply conduit 28 connects the fluid source, which can be a central oxygen supply source for all of the assemblies 10, to inlet port 24 and flexible fluid supply conduits 29 connect the outlet ports 26 to the masks 16 whereby breathing fluid passes from the source through conduit 28 into valve assembly 14 via inlet port 24 and out of valve assembly 14 via outlet ports 26 to masks 16 through conduits 29 when the system is fully actuated in response to a change in pressurization. Valve assembly 14 is not a part of this invention, per se, and is available from Pacific Precision Products, 4007 West Segerstrom Avenue, Santa Anna, Calif. 92704. However, any suitable conventional valve arrangement which is normally closed to fluid flow and operable as herein described can be used. The breathing fluid can be supplied by a standard container of gaseous oxygen or by a solid state chemical source such as an oxygen generating candle.

In the illustrated form, each mask 16 is of the modified phase dilution type comprising a truncated hollow cone 30 of suitable material such as synthetic rubber open through its larger end 32 which is adapted to be held against the face of a user and kept in place by an elastic band 34. The smaller end 36 of each mask 16 is connected to a reservoir bag 38 which is connected to conduit 29 whereby breathing fluid is provided through conduit 29 into the bag 38 to accumulate flow when the user is not inhaling. Attached at the smaller end 36 of mask 16 are three flapper valves 40. One flapper valve is spring loaded to be a phase dilution valve which allows a predetermined amount of outside air into the mask to mix with the breathing fluid supplied to the user so that each user will receive a metered amount of fluid. Another flapper valve is an exhalation valve through which the exhaled carbon dioxide from the user is dispensed to the surrounding atmosphere. The third flapper valve permits fluid flow from the reservoir bag 38 to mask 16 and closes to prevent reverse flow. Such mask arrangements are known in the art, and are not, per se, a part of this invention. Other face masks, including masks equipped with demand regulators can be utilized in the present invention.

Each storage container 12 has a door 40 suitably pivoted at one end on a hinge generally indicated 42 for swinging movement between the closed position shown in FIG. 5 and an open position as illustrated in FIGS. 1-3. A spring loaded bar 46 having coiled spring ends 44 (FIG. 3) carried by hinge 42 forces the door 40 to pivot downwardly into the open position of FIG. 1 when the door is unlatched. The springs ends 44 are coiled about the hinge pin 45 and their outer ends are secured to the bottom wall of the container 12. Bar 46 is formed of spring wire, and is of generally U-shaped unitary construction, having legs 47 which extend from ends 44 toward the outer end of the door 40 where they are joined by straight bight portion 49 which extends parallel to and somewhat inboard of the outer, opening end of door 40. The inner end portions of legs 47 are formed to an inverted, modified U-shape, as indicated at 51, so that the portion 49 and the outer end portions of legs 47 are stressed against door 40 when the latter is closed, with maximum stressing occuring when the door is fully closed. Bar 46 thereby urges door 40 open and such opening bias continues until door 40 is opened to approximately the position of FIG. 1. As the door 40 opens further, beyond the position of FIG. 1, spring bar 46 becomes fully unwound and relaxed, and the door 40 moves away from the outer end 49, which remains fixed against fabric liner 18 to aid in tensioning the same.

Each door 40 forms a portion of container 12 and functions to cover the access opening 22 thereby retaining mask 16 in a stowed condition within container 12.

Door 40 is normally retained in a closed position by a latch generally indicated 48 received in a socket 53 in assembly 14. In response to a drop in cabin pressurization within the aircraft fluid is supplied through conduit 28 into valve assembly 14, creating a pneumatic pressure build up within the valve assembly 14 whereby latch 48 is automatically released in response to the such pressure thereby releasing door 40. The latch mechanism is not a part of this invention and any conventional latch can be used. For example, a fluid supply and fluid pressure activated release of the type shown in U.S. Pat. No. 2,931,355, incorporated herein by reference, can be used. Alternatively, a solenoid operated latch release mechanism of the type shown, for example, in U.S. Pat. No. 3,536,070, incorporated herein by reference, can be used.

Mask ejection means 18 comprises a fabric liner 54 attached at one end to container 12 at the upper edge of access opening 22, as shown at 50, and attached to its other end to the opening end of door 40, as shown at 52. Liner 54 is automatically operable to eject mask 16 through access opening 22 upon movement of door 40 to an open position thereby enabling the subsequent gravitational dropping of the mask 16 to the user. The length of liner 54 is adjusted by wrapping and unwrapping the end 50 about bars (not shown) secured against the container top wall by screws 56. In the normal, stowed condition, masks 16 and the associated coiled flexible conduits 29 rest freely on liner 54 in a sling type configuration within container 12 as shown at 58 in FIG. 1. The masks 16 are supported in a stowed condition on liner 54 without touching the bottom of container 12 when door 40 is in a closed position. As illustrated in FIGS. 1-3, consecutively, upon release of latch 48 in response to a change in cabin pressurization to a predetermined level, spring loaded bar 44 forces door 40 to pivot outwardly and downwardly to approximately the position of FIG. 1, preferably slightly beyond a 90 degree opening movement. Thereafter, door 40 continues to open, moving away from bar 46 under the influence of gravity to the more fully open position of FIGS. 2 and 3. Such continued opening movement of door 40 draws fabric line 54 over the outer end 49 of bar 46 which, being fully unstressed, remains fixed and resiliently bears against the underside of liner 54 as shown in FIG. 2. In this way, door 40 and bar 46 cooperate to draw lienr 54 taut against the outer end 44 of bar 46. This forcibly ejects masks 16 outwardly through access opening 22 beyond container 12 and door 40 to enable gravity induced dropping of the masks to the user.

With reference to FIG. 3, the masks are shown in a fully downwardly deployed position within reach of the user for use at an associated passenger station (not shown). The free fall of masks 16 is arrested by lanyards 60 which connect between conduits 29 at 62 and control pins 64 on valve assembly 14, the lanyards 60 being connected to pins 64 by eyelets 66. Lanyards 60 thus support masks 16 within reach of intended users and in this position, hang taut under the weight of masks 16 while conduits 29 remain slack as illustrated at 68 in FIG. 3. Traction on lanyard 60, as by the positive action of an individual user pulling downward on one of masks 16, withdraws pin 64 from valve member 68 to actuate the supply of breathing fluid to that mask.

The operation is believed to be apparent from the foregoing description. Latch 48 operates automatically in response to depressurization within the aircraft whereby masks 16 are forcibly ejected from container 12 to enable subsequent gravity influenced dropping of the masks 16 downwardly to positions where they are suspended by lanyards 60 within reach of the user in the crew and passenger stations. The ejection force executed by tension means 18 is adequate to overcome any tendency of masks 16 and conduits 29 to resiliently wedge against the side walls of container 12. Pulling downwardly on any of the masks 16 and/or attached lanyards 60 withdraws control pin 64 from portions 68 of fluid valve assembly 14 which thereby initiates the flow of oxygen to the masks.

With reference to FIGS. 4–6, container 12 includes a test strap 70 attached to door 40 by snaps 72. The test strap is included in a preferred embodiment of the present invention since testing of emergency equipment is necessary and often mandatory. As shown in FIG. 6, the test strap 70 can be pivoted so as to attach at one end to a snap 74 on the top wall of container 12. The latch mechanism 48 can be manually released by inserting a tool through an opening 76 (FIG. 5) in door 40, and if in operative condition, the door 40 will fly open until testing strap 70 engages thereby retaining door 40 in a semi-open position as shown in FIG. 6 so that the masks 16 (not shown) remain within compartment 12.

It will be understood that the foregoing description and illustration is by way of example only and that such modifications and changes as may suggest themselves to those skilled in the art are intended to fall within the scope of the present invention as defined by the appended claims.

We claim:

1. An aircraft emergency breathing assembly automatically operable to present a breathing face mask to a user upon a loss of cabin pressurization, said assembly comprising:
   a storage container having an access opening and adapted to be mounted in an aircraft cabin with said opening in a generally vertical plane of orientation;
   fluid valve means carried by said container, said valve means being adapted for connection to a source of breathing fluid;
   a face mask stowed in said container, said mask being operatively connected to said valve means to provide breathing fluid to a user;
   a door connected to said container for closing said access opening and thereby retaining said mask within said container;
   door opening means automatically operable to move said door from a closed position to an open position relative to said access opening in response to a loss of cabin pressurization; and
   mask ejection means in the form of a flexible liner connected to said door, said mask ejection means being automatically operable in response to movement of said door to said open position to cause said flexible liner to eject said mask from said container through said access opening and beyond said door to enable gravity influenced dropping of said mask toward a position of use.

2. An emergency breathing assembly as set forth in claim 1, wherein said flexible liner supports said mask thereon when said mask is stowed in said container, said liner being drawn sufficiently tight to eject said mask from said container upon movement of said door to said open position.

3. An emergency breathing assembly of claim 2, wherein said liner is a fabric material.

4. An emergency breathing assembly as set forth in claim 2, wherein said door is pivotally connected at one end to said container adjacent the lower edge of said access opening, said liner being connected at one end thereof to said container adjacent to the upper edge of said access opening and at the other end thereof adjacent the other end of said door whereby when said door moves from said closed to an open position said liner is drawn taut thereby ejecting said mask from said container.

5. An emergency breathing assembly as set forth in claim 4, wherein said door opening means includes spring means for urging said door to an open position, said spring means being operable to aid in drawing said liner taut upon movement of said door to a full open position.

6. An emergency breathing assembly as set forth in claim 5 wherein said spring means comprising a spring loaded bar secured to said container adjacent the connection between the door and the container and positioned between said liner and said door to bear against the latter when said door is in said closed position, said spring loaded bar moving said door to a partially open position and being held against further opening movement with said door thereby tensioning said liner as said door moves to a fully open position.

7. An emergency breathing assembly as set forth in claim 1 wherein said door opening means includes spring means urging said door from said closed position to an open position.

8. The emergency breathing assembly of claim 1 wherein a plurality of face masks are stowed in said storage container, said mask ejecting means being operable to eject all of said masks from said container through said access opening.

9. An emergency breathing assembly as set forth in claim 1 further including latch means for releasably holding said door in said closed position, said latch means being operable to release said door upon loss of cabin pressurization.

10. A method of deploying an aircraft emergency breathing face mask from a stowed position within a storage container to a position beyond the container to enable subsequent gravity influenced dropping of the face mask to a user, the container being provided with a flexible liner, the face mask initially being positioned within the container in such a manner as to inhibit gravity dropping of the mask from the container, the container being of the type having an access opening in a generally vertical plane of orientation, the opening normally being closed by a door which opens automatically in response to a drop in cabin pressurization, a portion of the liner being attached to the door, comprising the steps of:
   stowing the mask on a flexible liner within the container; and
   tensioning the liner automatically in response to movement of the door from a closed to an open position in a manner expelling the mask from the container through the access opening to a position enabling subsequent gravity influenced dropping of the mask to a user.

11. An aircraft emergency breathing assembly automatically operable to present a face mask to a user upon loss of cabin pressurization; said assembly comprising:

a storage container having an access opening, the storage container being adapted to be mounted in an aircraft cabin with the access opening in a generally vertical plane of orientation;

a face mask stowed in the storage container, the face mask being capable of providing breathing fluid to a user;

a door connected to the storage container for movement between closed and open positions, the door closing the access opening when in the closed position to thereby retain the face mask within the storage container;

door opening means for automatically moving the door from the closed position to the open position relative to said access opening in response to a loss of cabin pressurization; and mask ejection means in the form of a flexible liner connected to said door, said mask ejection means being automatically operable in response to movement of the door from the closed position to the open position to cause said flexible liner to initially eject the face mask from the storage container through the access opening to a position beyond the door, the face mask subsequently dropping under the influence of gravity to a position of use.

12. An emergency breathing assembly as set forth in claim 11, wherein the liner supports the face mask thereon when the face mask is stowed in the storage container and the door is in its closed position, the liner being drawn sufficiently tight to eject the face mask from the storage container upon movement of the door to the open position.

* * * * *